United States Patent
Genovese

(10) Patent No.: US 6,516,445 B1
(45) Date of Patent: Feb. 4, 2003

(54) SYSTEM AND METHOD FOR DETECTING POINT-OF-DEPLOYMENT (POD) MODULE FAILURE

(75) Inventor: Dave Genovese, Rochester, NY (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/532,121

(22) Filed: Mar. 21, 2000

(51) Int. Cl.[7] .............................. G06F 15/40; H04L 1/00
(52) U.S. Cl. ........................................ 714/821; 714/799
(58) Field of Search ................................. 714/821, 814, 714/799, 798

(56) References Cited

U.S. PATENT DOCUMENTS

| | | | |
|---|---|---|---|
| 5,613,001 A | * | 3/1997 | Bakhoum ........................ 380/4 |
| 5,675,654 A | | 10/1997 | Ryan ............................ 380/48 |
| 6,298,400 B1 | * | 10/2001 | Candelore ....................... 710/71 |

OTHER PUBLICATIONS

Conditional Access System for Terrestrial Broadcast, ATSC, pp. 1–27 (Jul. 17, 1999).
Digital Video Broadcasting (DVB), *European Telecommunications Standards Institute*, 13 pgs. (Oct. 1996).

* cited by examiner

*Primary Examiner*—Phung M. Chung
(74) *Attorney, Agent, or Firm*—RatnerPrestia

(57) ABSTRACT

A method is provided in a digital receiver interfacing with a point-of-deployment (POD) module and receiving a first data stream having a first predetermined pattern. The method for detecting failure of the POD module includes the steps of: receiving the first data stream; forwarding the first data stream to the POD module; receiving a second data stream having a second predetermined pattern from the POD module; monitoring validity of the first and second data streams; and if the first data stream is valid and the second data stream is invalid, providing a failure alert on the POD module.

14 Claims, 7 Drawing Sheets

SYSTEM AND METHOD FOR DETECTING POINT-OF-DEPLOYMENT (POD) MODULE FAILURE

FIELD OF THE INVENTION

The present invention relates generally to data reception, processing and transmission of digital signals between a cable distributor and an end user. More particularly, the present invention relates to the failure detection of a point-of-deployment (POD) module inserted into a digital receiver of the end user.

BACKGROUND OF THE INVENTION

A cable distributor provides various services to a customer, for example multiple television programs. The television programs are transmitted from the distributor's headend to the customer (end user) by way of cable and satellite. The end user typically receives the television programs through a digital receiver.

Depending on the type of services requested by the end user, a point-of-deployment (POD) module may be required. For example, a POD module is required, when the end user wishes to view a pay-per-view program. Typically, the POD module is a PC card given to the end user by the cable distributor. The end user inserts the POD module into the digital receiver.

In operation, the television program is scrambled and transmitted-by the headend to the end user's receiver. The receiver sends the scrambled signal to the POD module, the latter descrambling the signal. The descrambled signal is then sent from the POD module to the receiver for further processing and eventual display.

One example of a POD module (which is not a PC card but a credit card) is the National Renewable Security Systems (NRSS) Smart Card used for decrypting an encoded MPEG-2 format data stream, described in. U.S. Pat. No. 5,675,654. It is noted that the NRSS Smart Card includes a resident, programmable microprocessor and decryption engine.

The syntax for the MPEG-2 standard received by the NRSS Smart Card defines several layers of data records which are used to convey both audio and video data. To transmit information, a digital data stream representing, for example, multiple video sequences, is divided into several smaller units and each of these units is encapsulated into a respective packetized elementary stream (PES) packet. For transmission, each PES packet is divided, in turn, among a plurality of fixed-length transport packets. Each transport packet contains data relating to only one PES packet. The transport packet also includes a header, which holds control information sometimes including an adaptation field to be used in decoding the transport packet.

When decryption is necessary, valid data beginning with a predetermined synchronization byte is sent to the NRSS Smart Card. The Smart Card recognizes this predetermined synchronization byte (i.e., distal pattern), synchronizes to it and begins decrypting, for example, the next 188 bytes.

The interface between the POD module and the digital receiver is defined in Society for Cable Television Engineers (SCTE) DVS131, POD Module Interface, which is incorporated herein for its teachings of physical, hardware and software interfaces existing between the POD module and the digital receiver.

POD modules are built by several manufacturers and given to end users by the cable distributor. Quality control typically varies from one manufacturer to another, resulting in reliability differences between one POD module and another POD module. One POD module may be functional, while another may be inoperative and a third may be marginally functional.

Presently, when an end user inserts a POD module into the receiver, and does not see a viewable program, the end user has no way of knowing whether the fault is in the transmission, the receiver or the POD module.

The present invention addresses this problem.

SUMMARY OF THE INVENTION

To meet this and other needs, and in view of its purposes, the present invention provides a method for detecting failure in a point-of-deployment (POD) module. The POD module interfaces with a digital receiver and receives a first data stream with a first predetermined pattern. The method includes receiving the first data stream; forwarding the first data stream to the POD module; receiving a second data stream with a second predetermined pattern from the POD module; monitoring validity of the first and second data streams; and if the first data stream is valid and the second data stream is invalid, providing a failure alert regarding the POD module.

The method includes monitoring each of the first and second data streams for a predetermined synchronization byte. The method also includes monitoring each of the first and second data streams for a packet start and an end-of-packet; and monitoring each of the first and second data streams for a clocking signal. The method further includes synchronizing and comparing each of the respective clocking signals to an internal clocking signal. The communications between the digital receiver and the POD module are also monitored.

It is understood that the foregoing general description and the following detailed description are exemplary, but are not restrictive of the invention.

The invention is best understood from the following detailed description when read in connection with the accompanying drawing. Included in the drawing are the following figures.

DETAILED DESCRIPTION OF THE INVENTION

Figure 1:
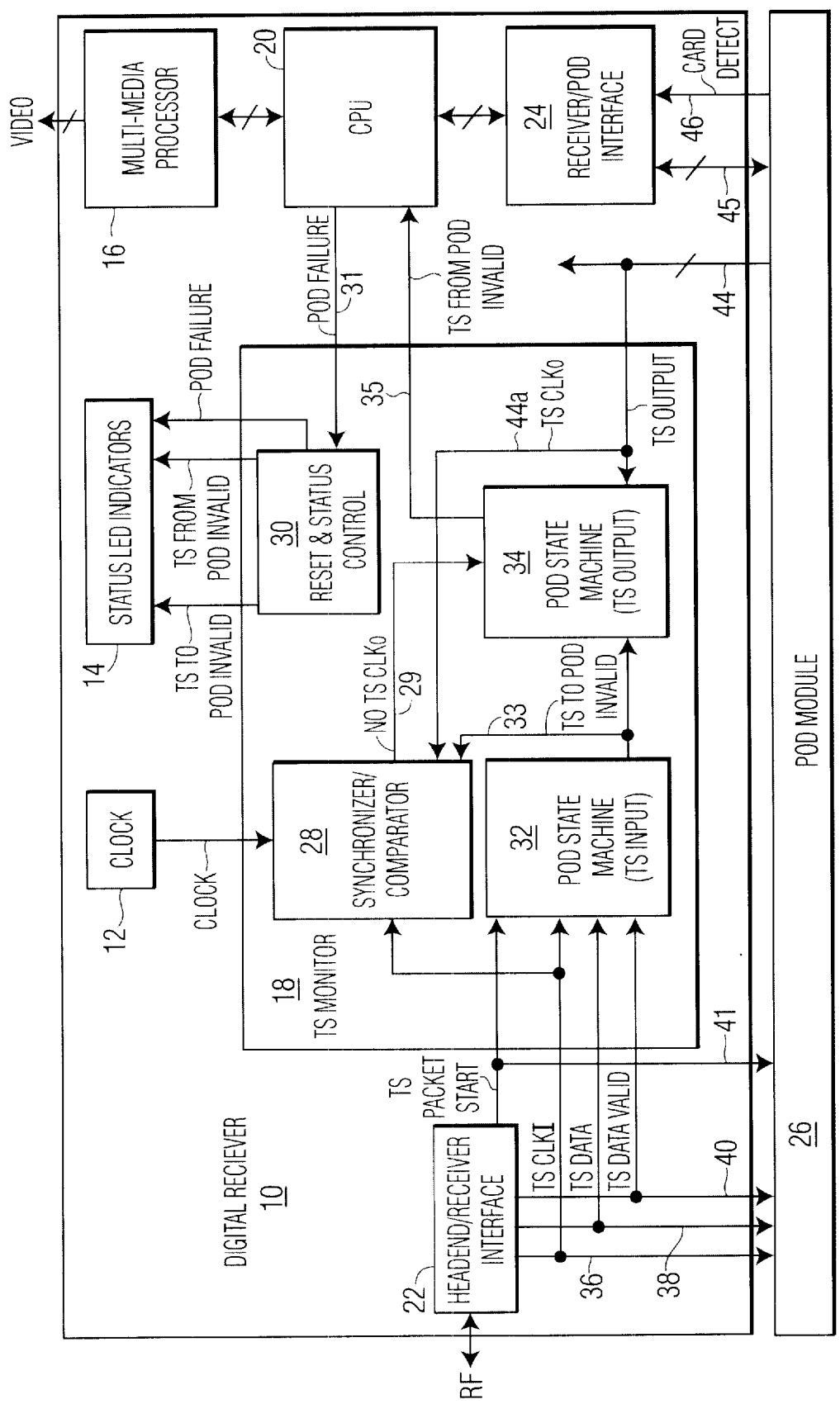
FIG. 1 is a high-level functional block diagram of a digital receiver including an exemplary monitoring system and its various interfaces.

Turning to the figures, FIG. 1 shows a high-level functional block diagram of digital receiver 10 communicating with POD module 26. As shown, digital receiver 10 includes transport stream (TS) monitor 18 and CPU 20, each communicating with POD module 26. In the exemplary embodiment of the present invention, TS monitor 18 and CPU 20 both contribute to the detection of a failure in POD module 26, as explained below.

CPU 20 is a host microprocessor and is coupled to POD module 26 by way of receiver/POD interface circuit 24. CPU 20 is also coupled to multi-media processor 16, the latter providing video signals to the end user. As will be appreciated by those skilled in the art, the method of coupling the POD module, the CPU and the multi-media processor is well known.

Receiving the transport stream at the front end of digital receiver 10 is headend/receiver interface 22. As known, headend/receiver interface 22 partitions the transport stream into a clocking signal (TS CLKin on line 36), data (TS DATA on eight parallel data lines 38), a data valid signal (TS DATA VALID on line 40) and a transport stream packet start signal (TS PACKET START on line 41). The received transport stream is sent to POD module 26.

POD module 26 may decrypt the received transport stream, if authorized, or it may send the transport stream, without decryption, to digital receiver 10 by way of output lines 44. In either situation, the transport stream maintains its identity. In other words, the transport stream at the input lines to POD module 26 is partitioned into four types of signals (TS CLKin, TS DATA, TS DATA VALID and TS PACKET START), as already described. Although not shown, the transport stream at output lines 44 is also partitioned into TS CLKout signal, TS DATA, TS DATA VALID and TS PACKET START (shown as TS OUTPUT on output lines 44 in FIG. 1).

Still referring to FIG. 1, transport stream (TS) monitor 18 is now described. As shown, TS monitor 18 includes synchronizer/comparator 28, reset and status control 30, POD state machine 32 and POD state machine 34. In the exemplary embodiment, TS monitor 18 is implemented in a programmable logic device (PLD). POD state machine 32 monitors the transport stream provided on input lines 36, 38, 40 and 41. As explained below, POD state machine 32 detects whether the transport stream provided into POD module 26 is valid or invalid. If invalid, POD state machine 32 provides a TS TO POD INVALID signal on line 33. Similarly, POD state machine 34 monitors the transport stream provided on output lines 44. As described below, POD state machine 34 detects whether the transport stream from the POD module is valid or invalid. If invalid, POD state machine 34 provides a TS FROM POD INVALID signal on line 35.

The transport stream clock signals are also monitored by TS monitor 18. The signals TS CLKin on input line 36 and the TS CLKout on output lines 44 (shown as line 44a) are respectively compared to a clocking signal from clock circuit 12. The clocking signal may, for example, be a 27 MHz clock signal. As explained below, synchronizer/comparator 28 provides a NO TS CLKout signal on line 29, if a determination is made that the transport stream clock signal on output line 44a is not present.

Completing the description of FIG. 1, CPU 20 provides a POD FAILURE signal on line 31, when the CPU detects a failure in the POD module. The POD FAILURE signal is provided to reset and status control circuit 30 which, in turn, resets logic and provides status indication signals (TS TO POD INVALID, TS FROM POD INVALID and POD FAILURE) to status LED indicators 14.

In another embodiment, CPU 20 may provide an on screen display (OSD) message to the end user, by way of multi-media processor 16, informing the end user of a POD module failure. In still another embodiment, CPU 20 may provide a POD failure message to the headend by way of headend/receiver interface 22, or by another modem capable of communicating with the headend.

Figure 2:
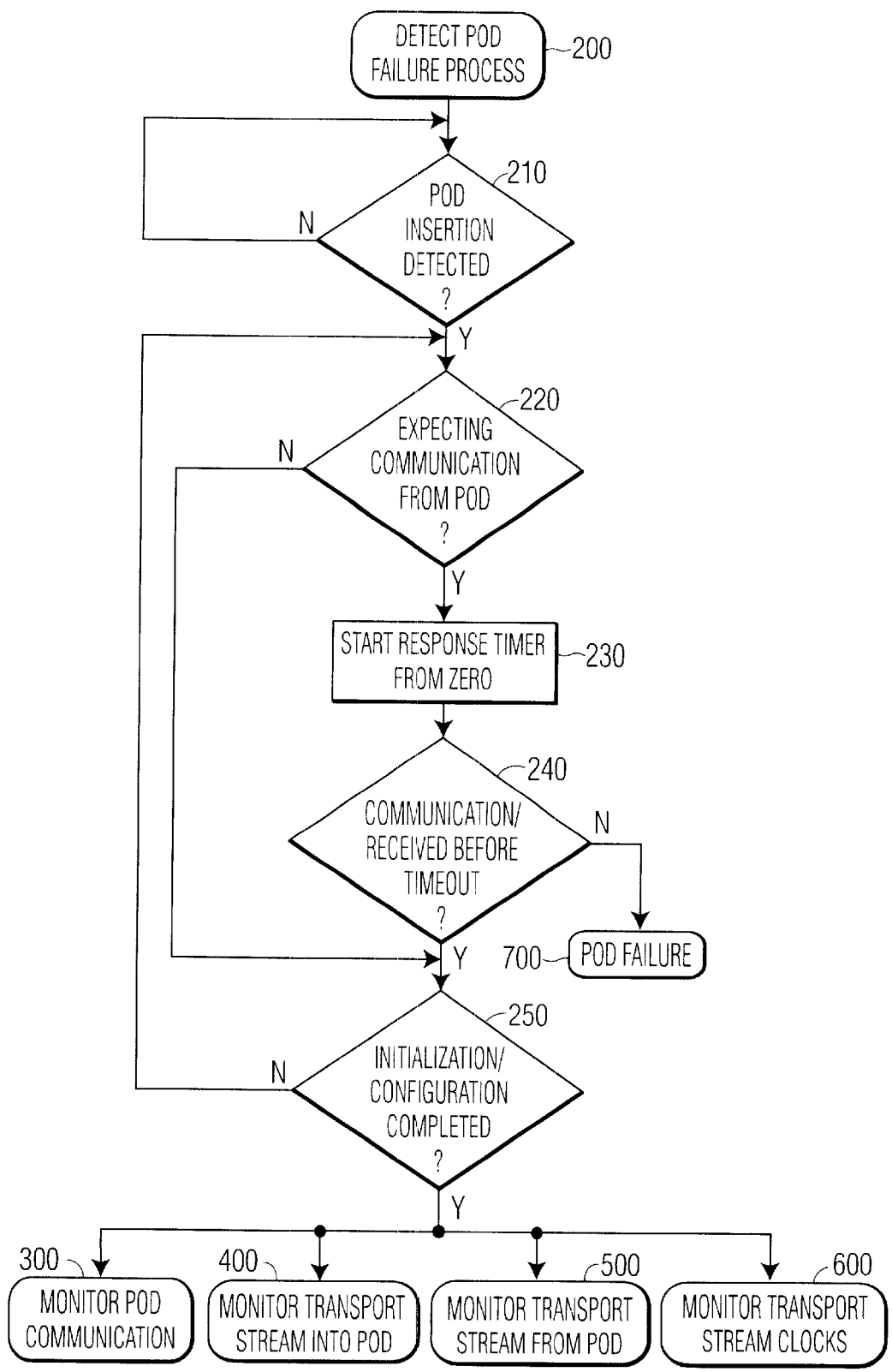
FIG. 2 is an exemplary flowchart illustrating how the monitoring system detects POD module failure.

The method for detecting a POD module failure is now described in more detail by reference to FIGS. 2–7. POD failure detection commences at step 200, as shown in FIG. 2. CPU 20 detects that POD module 26 is inserted into digital receiver 10 (step 210). The detection may be based on the presence of a CARD DETECT signal on line 46 from the POD module. If at any time the POD module is removed from the receiver, the method is aborted, but commences again at the beginning, when the POD module is re-inserted.

After insertion of the POD module is detected, the CPU initializes the receiver so it may communicate with the POD module (step 220) by way of input/output lines 45. If communications are expected, a response timer is started from zero (step 230). If a communication is not received before a predetermined timeout (for example, one second), step 240 branches to a POD module failure decision (step 700). If a communication is received before the predetermined timeout, step 240 branches to step 250, the latter completing the initialization and configuration of the POD module. Once initialization and configuration are completed, the method enters the next phase, which includes monitoring communications from the POD module (step 300), monitoring the transport stream into the POD module (step 400), monitoring the transport stream from the POD module (step 500), and monitoring the transport stream clock signals (step 600). If at any time during initialization and configuration, the CPU determines that the receiver is not receiving a required response, a POD MODULE FAILURE signal is placed by the CPU on line 31.

Figure 3:
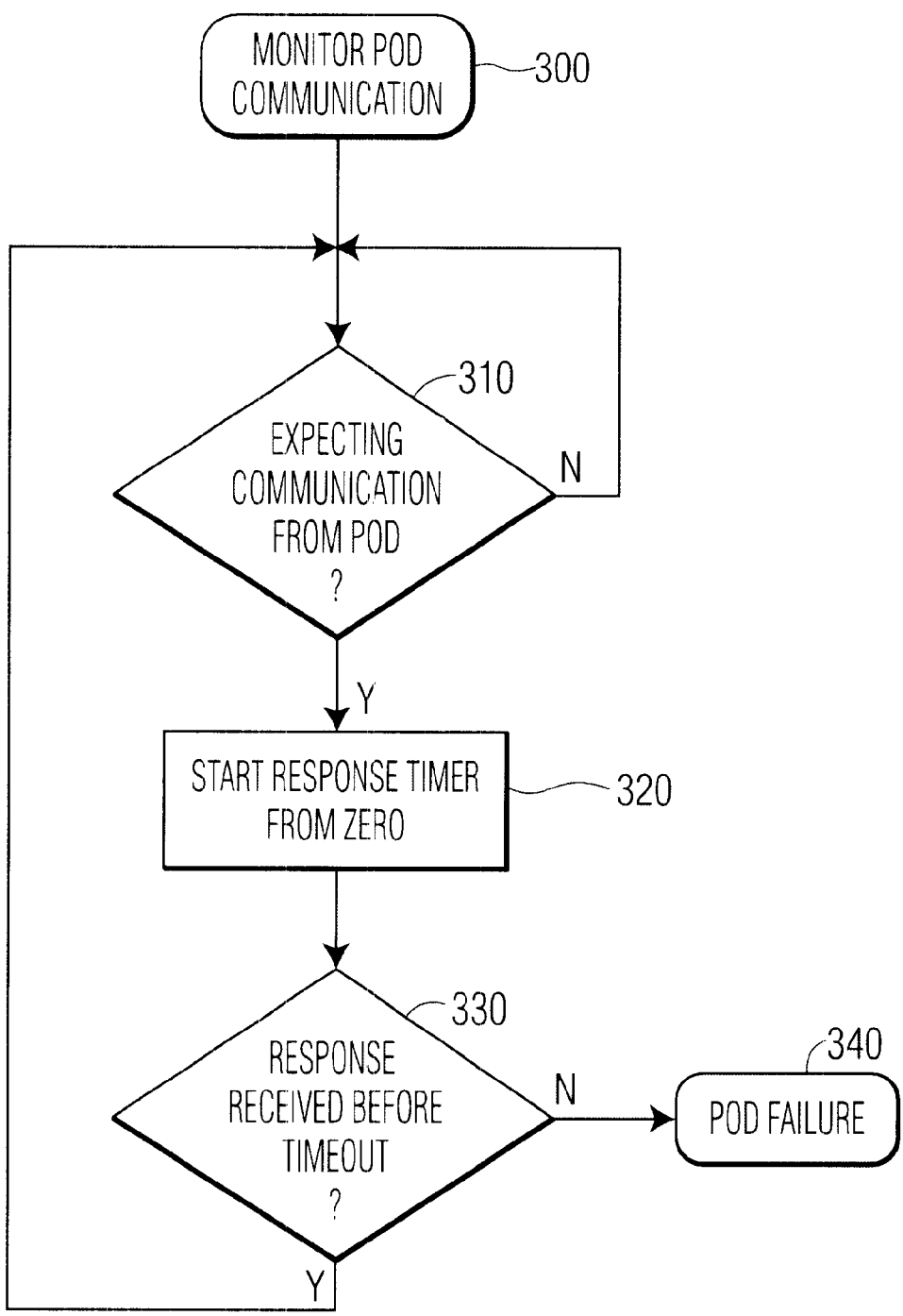
FIG. 3 is an exemplary flowchart illustrating steps executed during the monitoring of communications from the POD module to the receiver.

After initialization and configuration are completed, CPU 20 continues to monitor one-way or two-way communications with the receiver, as shown in steps 300–340 in FIG. 3. If communications are expected from the POD module (step 310), a response timer is started in step 320. If the response is received within a predetermined timeout period (step 330), the method branches to beginning of step 310. If the response is not received within the timeout period, the CPU provides the POD MODULE FAILURE signal on line 31 (step 340).

Figure 4:
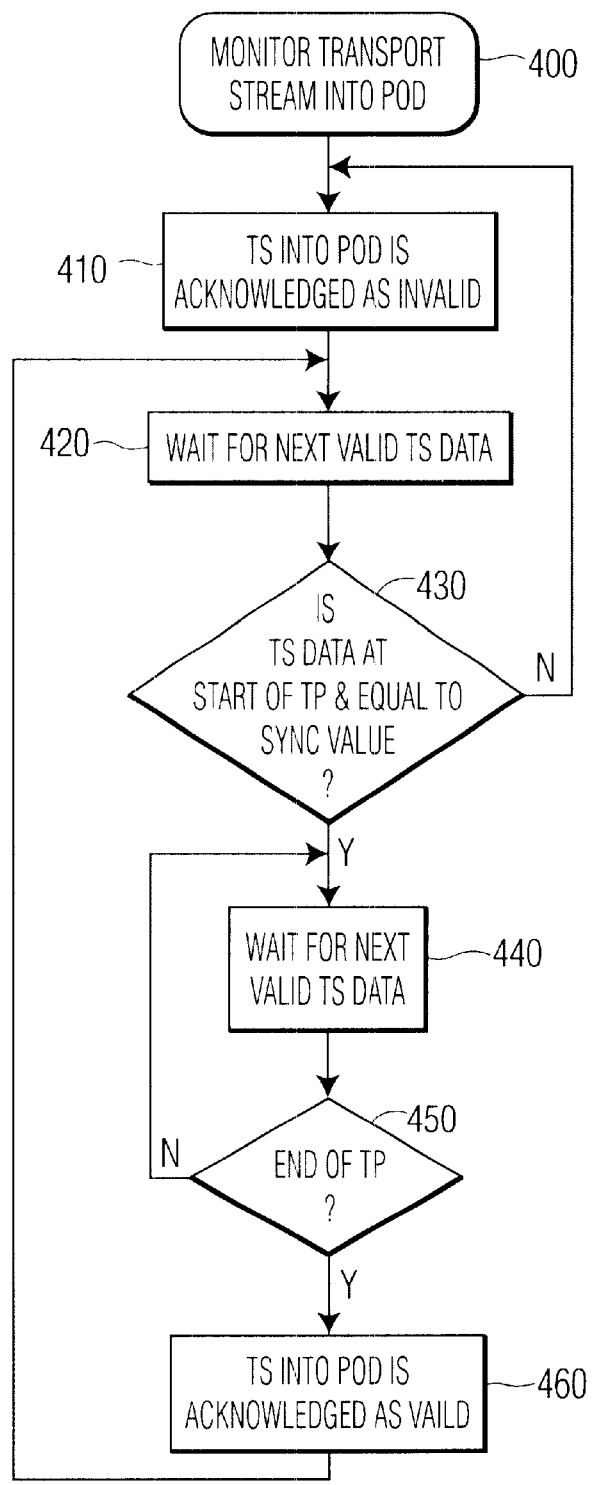
FIG. 4 is an exemplary flowchart illustrating steps executed during the monitoring of transport streams into the POD module.

Referring now to FIG. 4, the transport stream into the POD module is monitored by POD state machine 32, beginning at step 400. The TS TO POD INVALID signal on line 33 is assumed first to be invalid (step 410). The POD state machine then waits for the next transport stream with valid data (step 420). At step 430, the state machine determines whether data on lines 38 are at the beginning of the transport stream and whether a correct sync_byte is present. It will be appreciated that valid data must include sync_byte (47 hex). If the data does not contain a correct sync_byte, the state machine sets the TS TO POD INVALID signal on line 33. If the correct sync byte is present at the beginning of the transport packet, the state machine waits for the next TS DATA VALID signal (line 40) to arrive (step 440) and for the end of the transport packet (step 450). Having correctly passed these checks, the transport stream into the POD module is acknowledged as being valid (step 460). POD state machine 32 may then repeat the method.

Figure 5:
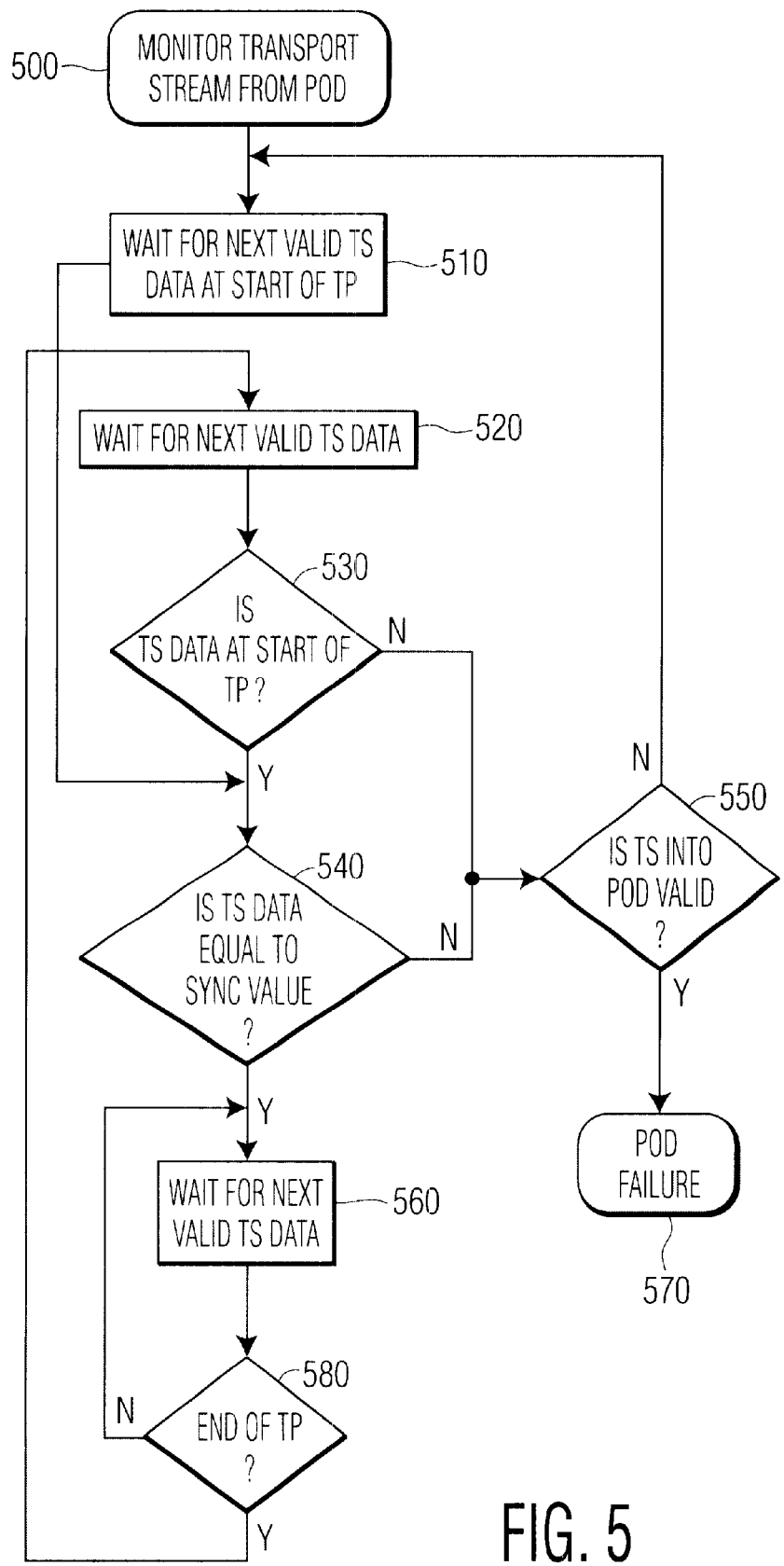
FIG. 5 is an exemplary flowchart illustrating steps executed during the monitoring of transport streams from the POD module.

In a similar manner, the transport stream out of the POD module is monitored by POD state machine 34, beginning at step 500, shown in FIG. 5. The state machine determines whether the transport stream from the POD module is correct (steps 510, 540, 560 and 580). Step 510 determines that the TS DATA VALID and TS PACKET START signals on output lines 44 are correct. When step 580 determines that the transport packet has ended, state machine 34 branches to step 520 and waits for the next transport packet. The method may then be repeated (steps 530, 540, 560 and 580).

If the transport stream from the POD module is not correct, the method enters step 550. A determination is made as to whether the transport stream into the POD module is valid (qualified by TS TO POD INVALID signal on line 33). If the transport stream into the POD module is valid, step 550 branches to step 570 setting a POD module failure decision. POD state machine 34 provides a TS FROM POD INVALID signal on line 35 to the CPU. The CPU, in turn, alerts TS monitor 18 with a POD FAILURE signal on line 31. If, however, the TS TO POD INVALID signal indicates that the input signal was invalid, control transfers to step 510 to wait for the next valid transport packet.

Figure 6:
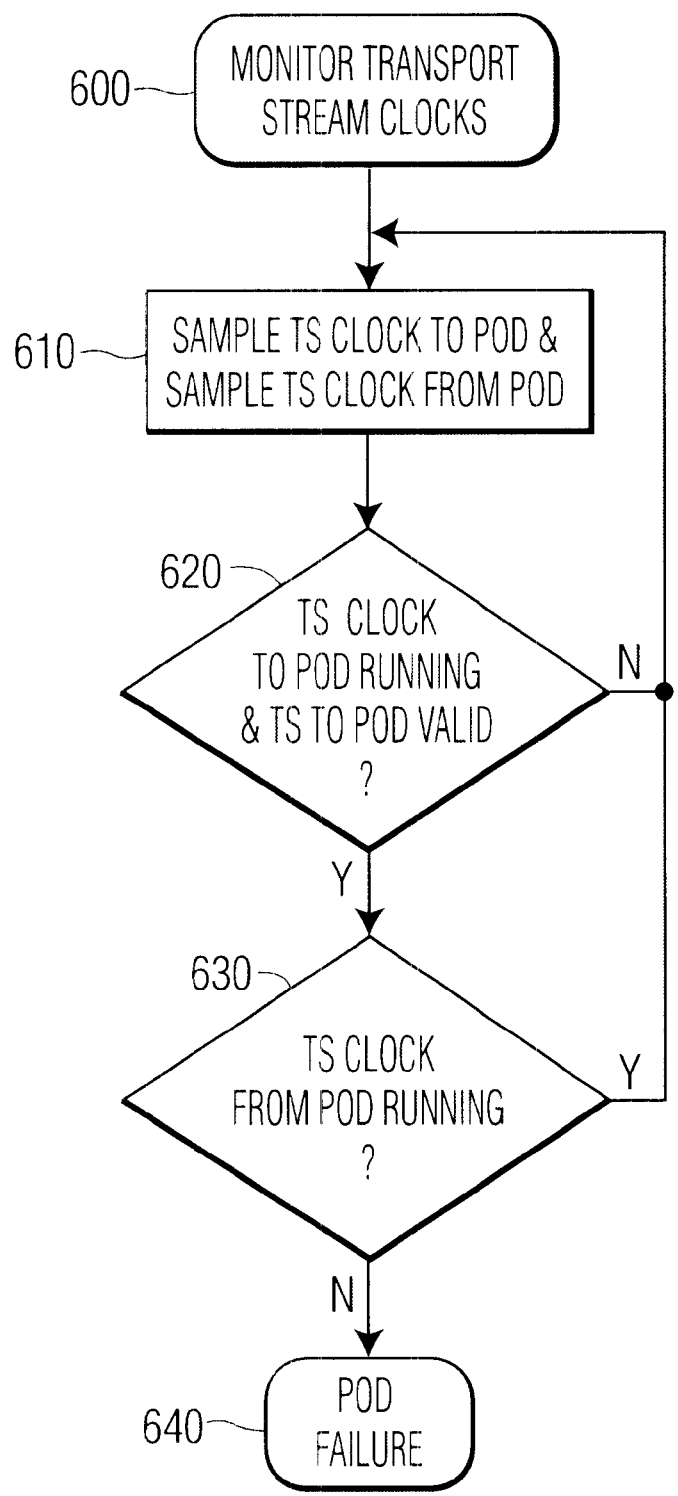
FIG. 6 is an exemplary flowchart illustrating steps executed during the monitoring of transport stream clocks into and out of the POD module.

Referring next to FIG. 6, the clock signals into and out of the POD module are monitored by synchronizer/comparator 28, beginning at step 600. The TS CLKin signal on line 36 and the TS CLKout signal on output line 44a (part of lines 44) are sampled (step 610). If the clock signal into the POD module is detected and the TS TO POD INVALID signal (line 33) is not set, step 620 branches to step 630. If the clock signal from the POD module is not detected, step 640 is reached setting a POD module failure. The synchronizer/comparator provides a NO TS CLKout signal on line 29 to POD state machine 34, and a TS FROM POD INVALID signal is provided on line 35, as previously explained. Further, a "NO" decision in step 620, or a "YES" decision in step 630 causes the method to branch back to step 610, without making a POD FAILURE decision.

Figure 7:
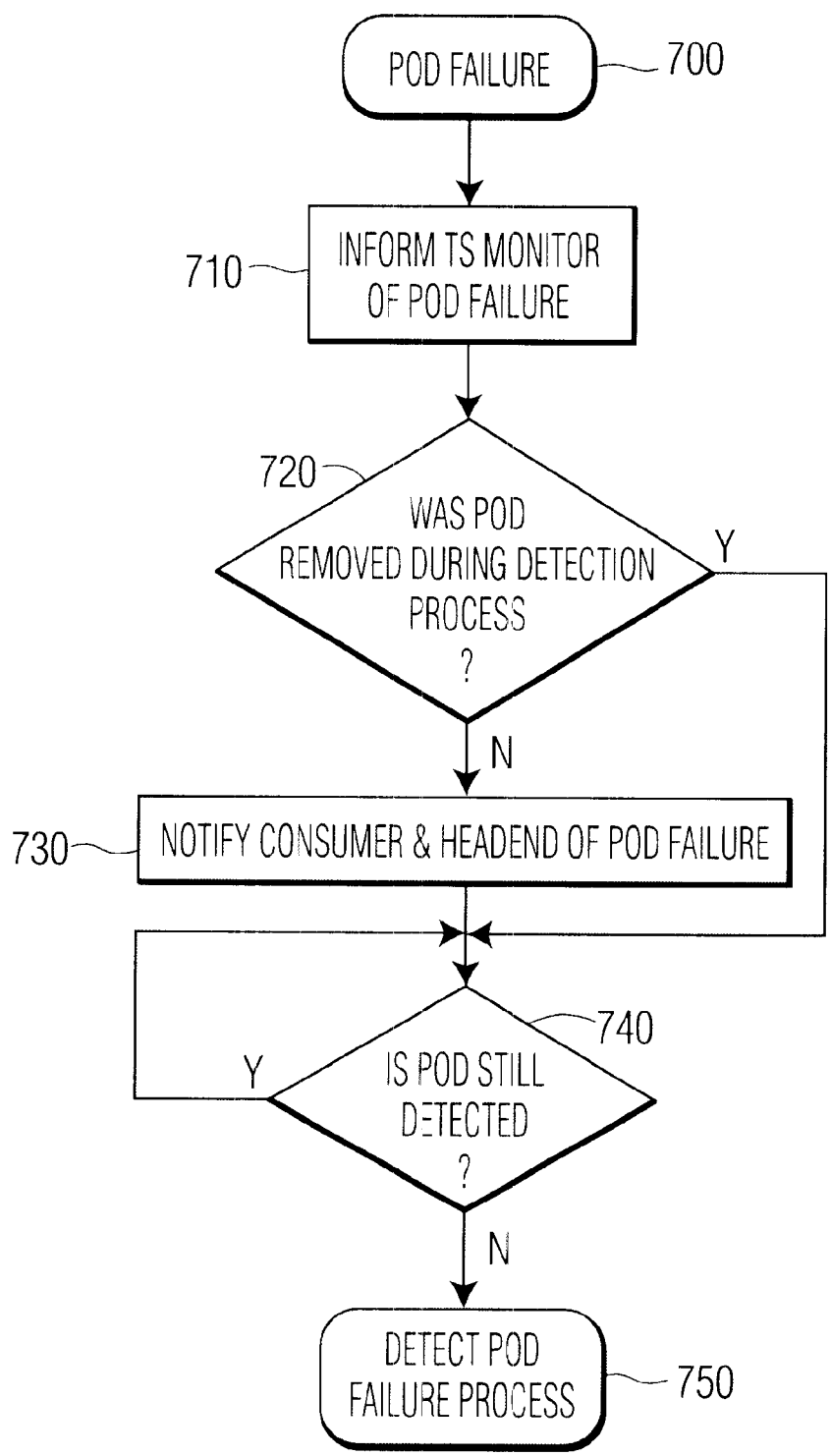
FIG. 7 is an exemplary flowchart illustrating steps executed after the monitoring system detects a POD module failure.

The CPU enters POD failure step 700, shown in FIG. 7, upon determining that initialization or configuration of the POD module is faulty (FIG. 2); upon being informed by TS monitor 18 that the transport stream from the POD module is faulty (FIGS. 4–6); or upon determining that communication between the POD module and the receiver is faulty (FIG. 3). The CPU alerts the TS monitor of the POD module failure (step 710). If the POD module has not been removed (step 720), the headend may be alerted and/or the end user may be notified of the POD failure (step 730). If the POD module has been removed, the CPU proceeds to steps 740 and 750 to again begin detection of a POD failure, as described in FIG. 2 (beginning at step 200).

Although the invention is illustrated and described herein as embodied in a method and apparatus for detecting a POD module failure by using a monitoring system including TS monitor 18 and CPU 20 in digital receiver 10, the invention is not intended to be limited to the details shown. Rather various modifications may be made in the details within the scope and range of equivalents of the claims and without departing from the invention. For example, the monitoring system may be partitioned between the CPU and the TS monitor in a manner different than described. In addition, the monitoring system may detect failure of a POD module that is coupled to a digital receiver processing data streams that are different than those described.

What is claimed:

1. In a digital receiver interfacing with a point-of-deployment (POD) module and receiving a first data stream having a first predetermined pattern, a method for detecting a failure of the POD module comprising the steps of:

(a) receiving the first data stream;
   (b) forwarding the first data stream to the POD module;
   (c) receiving a second data stream having a second predetermined pattern from the POD module;
   (d) monitoring validity of the first and second data streams; and
   (e) if the first data stream is valid and the second data stream is invalid, providing a failure alert on the POD module.

2. The method of claim 1 wherein step (d) includes monitoring each of the first and second data streams for a predetermined synchronization byte.

3. The method of claim 1 wherein step (d) includes monitoring each of the first and second data streams for a packet start and an end-of-packet.

4. The method of claim 1 wherein step (d) includes monitoring each of the first and second data streams for a clocking signal.

5. The method of claim 4 wherein step (d) includes synchronizing and comparing each of the respective clocking signals to an internal clocking signal.

6. The method of claim 1 wherein step (e) includes providing the alert to at least one of an end user and a headend.

7. The method of claim 1 wherein step (e) further includes detecting presence of the POD module in the digital receiver.

8. The method of claim 7 wherein step (e) includes detecting the presence of the POD module in the digital receiver responsive to receiving a failure alert and providing the alert to at least one of an end user and a headend only if the POD module is in the digital receiver.

9. A monitoring system for detecting a failure in a module comprising a digital receiver communicating with the module wherein (a) the digital receiver receives a first data stream having a first predetermined bit pattern and forwards the first data stream to the module, and (b) the module sends a second data stream having a second predetermined bit pattern to the digital receiver;
   a first monitor coupled to the digital receiver for monitoring the first predetermined bit pattern;
   a second monitor coupled to the module for monitoring the second predetermined bit pattern; and
   a fault detection processor coupled to the first and second monitors for detecting a fault in the first predetermined bit pattern and a fault in the second predetermined bit pattern,
   wherein when the first predetermined bit pattern is fault free and a fault is detected in the second predetermined bit pattern, then the module is determined to be faulty.

10. The monitoring system of claim 9 wherein each of the first and second predetermined bit patterns includes a synchronization byte.

11. The monitoring system of claim 9 wherein each of the first and second bit patterns includes a packet start and an end-of-packet.

12. The monitoring system of claim 9 wherein each of the first and second predetermined bit patterns includes a clocking signal.

13. The monitoring system of claim 12 including an internal clocking signal and a synchronizer/comparator for synchronizing and comparing each of the clocking signals to the internal clock signal.

14. The monitoring system of claim 9 including a fault alert circuit coupled to the fault detection processor for providing fault indication to at least one of an end user and a headend.

* * * * *